(12) United States Patent
Jones

(10) Patent No.: US 7,383,459 B1
(45) Date of Patent: Jun. 3, 2008

(54) APPARATUS AND METHOD FOR PHASE-BUFFERING ON A BIT-BY-BIT BASIS USING CONTROL QUEUES

(75) Inventor: Ian W. Jones, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 372 days.

(21) Appl. No.: 11/130,695

(22) Filed: May 16, 2005

(51) Int. Cl.
*G06F 1/04* (2006.01)
*G06F 11/00* (2006.01)
*G06F 13/42* (2006.01)
*H04L 7/00* (2006.01)

(52) U.S. Cl. .................. 713/503; 713/400; 713/600

(58) Field of Classification Search ............... 713/400, 713/503, 600; 370/412
See application file for complete search history.

(56) References Cited

U.S. PATENT DOCUMENTS

| 5,386,585 | A | * | 1/1995 | Traylor | .................. 712/29 |
| 5,758,139 | A | * | 5/1998 | Sutherland et al. | .................. 713/600 |
| 2004/0071151 | A1 | * | 4/2004 | Jones | .................. 370/412 |

OTHER PUBLICATIONS

Sutherland, Ivan et al., Gasp: A Minimal FIFO Control, Mar. 14, 2001, Seventh International Symposium on Advanced Research in Asynchronous Circuits and Systems, pp. 46-53.*
Publication: "Digital Systems Engineering" by William J. Dally and John W. Poulton, Cambridge University Press, 1998, ISBN 0-521-59292-5, pp. 470, 475-480 and 485.

* cited by examiner

*Primary Examiner*—Mark Connolly
(74) *Attorney, Agent, or Firm*—Park, Vaughan & Fleming LLP; Edward J. Grundler

(57) ABSTRACT

One embodiment of the present invention provides a system that facilitates phase-buffering on a bit-by-bit basis using a control queue. The system includes a control queue, wherein a stage in the control queue is configured to accept both a first control signal and a second control signal, wherein the first control signal and the second control signal are mutually exclusive, wherein the first control signal being asserted indicates the value of a corresponding bit is zero, while the second control signal being asserted indicates the value of the corresponding bit is one. A forward-transfer mechanism couples the first control signal or the second control signal from the input of the stage through storage elements to the output of the stage. A reverse transfer mechanism accepts an acknowledgement signal at the output of the stage and transfers the acknowledgement signal through a storage element to the input of the stage.

4 Claims, 13 Drawing Sheets

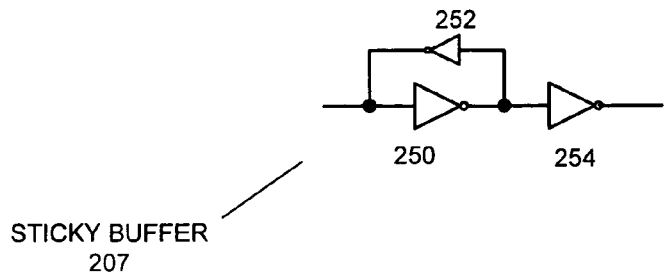
FIG. 2B
(PRIOR ART)
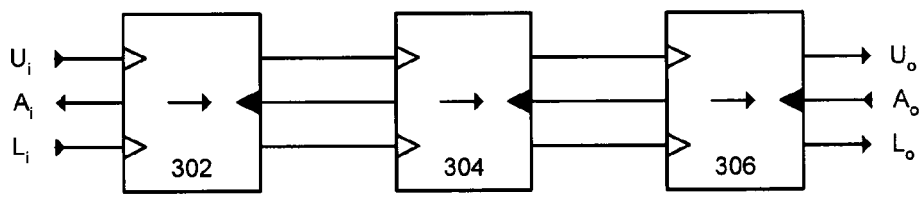
FIG. 3
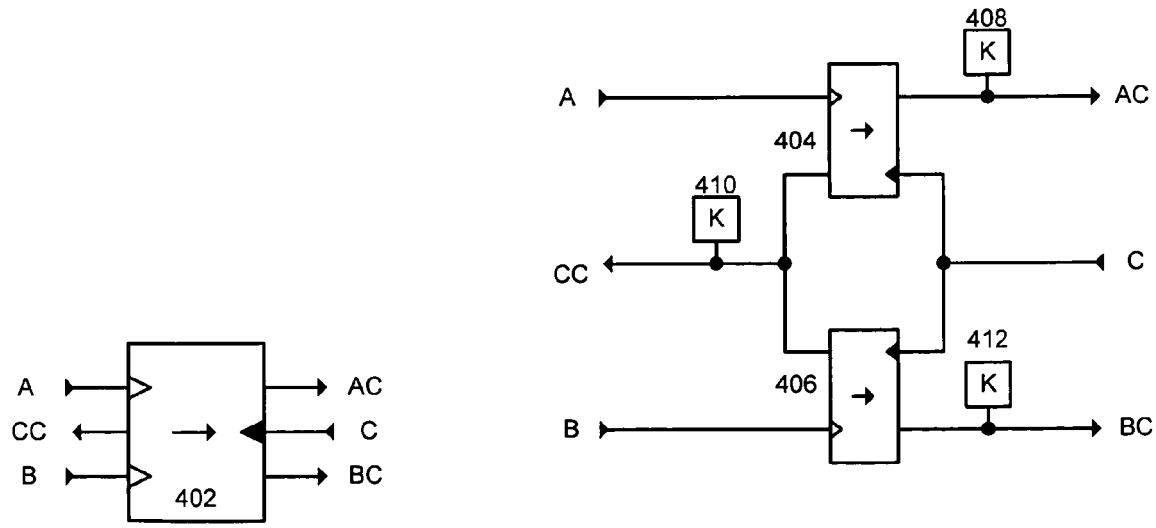
FIG. 4A　　　　　　　　FIG. 4B

APPARATUS AND METHOD FOR PHASE-BUFFERING ON A BIT-BY-BIT BASIS USING CONTROL QUEUES

BACKGROUND

1. Field of the Invention

The present invention is related to computer systems. More specifically, the present invention is related to an apparatus and a method for phase-buffering signals on a bit-by-bit basis using control queues.

2. Related Art

As computer systems become increasingly faster, signal propagation delays are becoming more critical. If propagation delays for data signals are not properly matched with corresponding clock signals, signals sent from one sub-unit of a computer system to another sub-unit may not have the correct timing in relation to the clock signal at the receiving end. This is true even though both the sending clock signal and the receiving clock signal are derived from the same clock source. The clock signals going to the source and destination travel through different paths and may incur different delays, which can cause skew in the data signals relative to the receiving clock signal. Reference is made here to the difference in arrival time of the clock signals at the transmit end and the receiving end as the phase-delay of the clock. This phase delay can be positive or negative. Note that temperature and voltage differences may affect the timing of the data and clock signals. Furthermore, coupling and interference from signals on adjacent wires may also affect the timing of the data and clock signals.

FIG. 1 illustrates a phase buffer 106 interposed between a transmitter module 104 and a receiver module 108. Transmitter module 104 and receiver module 108 receive a clock signal from clock source 102. The clock signal received at transmitter module 104 is delayed by delay A 114, while the clock signal received at receiver module 108 is delayed by delay B 116. Delay A 114 and delay B 116 are typically different from each other and are due to various causes, such as different components in their propagation paths, different temperatures of these components and different supply voltages of these components. Additionally, transmitter module 104 and receiver module 108 may be located in different integrated circuits. Note that delay A 114 and delay B 116 may include delays within transmitter module 104 and receiver module 108, respectively.

During operation, transmitter module 104 sends data 110 for consumption by receiver module 108. However, due to the differences in delay A 114 and delay B 116, transmitter module 104 cannot send data 110 directly to receiver module 108. Instead, transmitter module sends data 110 to phase buffer 106 using TX clock 118, which is derived from the clock signal delayed by delay A 114. Phase buffer 106 stores data 110 until such time as it is delivered to receiver module 108 as data 112. Data 112 is delivered to receiver module 108 using RX clock 120, which is derived from the clock signal delayed by delay B 116.

FIG. 2A illustrates a typical 3-stage flow-through FIFO. The upper portion of FIG. 2A depicts the control path, while the lower portion of FIG. 2A depicts the data path. Note that the data path may be a bus carrying several bits of data between data in 210 and data out 212.

In an asynchronous FIFO, typically control signals are bundled with the data bits, as shown in FIG. 2A. The forward-going "ready" control signal, often called "request," announces that the data are valid. Thus, there is a bundling delay constraint that the delay of the forward-going control signal must be the same as or greater than the delay of the forward-going data. The control must not announce that "the data are valid" when the data are not valid yet. Thus, care must be taken in the circuit design and chip layout to ensure that this bundling constraint is met.

The control path includes control stages 201-203 and the data path includes pass-gates 204-206 and sticky buffers 207-209. Sticky buffers 207-209 are described below in conjunction with FIG. 2B. Prior to data being stored within the FIFO, ready signals 222, 224, 226, and 228 and acknowledge signals 214, 216, 218, and 220 are all inactive. The combination of pass gate 204 and sticky buffer 207 form a latch. The same is true for the combination of pass gate 205 and sticky buffer 208, and the combination of pass gate 206 and sticky buffer 209.

When data becomes available at data in 210, the data source brings ready signal 222 to an active state. In response, control stage 201 causes pass-gate 204 to momentarily open and provide data in 210 to sticky buffer 207. Sticky buffer 207 holds the received state of data in 210 until control stage 201 is cycled again. Control stage 201 also activates ready signal 224 which passes to control stage 202 and acknowledge signal 220 to the data source. Note that acknowledge signal 220 and the control signal to pass-gate 204 both are designed to have an inherent delay, which allows data in 210 to be captured before the corresponding acknowledge signal 220 is set to active.

At a future time, acknowledge signal 218 from control stage 202 is activated, which causes control stage 201 to deactivate acknowledge signal 220 and to deactivate ready signal 224. This returns the first stage of the FIFO to its initial state. The second and third stages of the FIFO operate in a similar manner. For proper operation, the delay in a given control stage must be longer than the delay in the associated data stage. This is referred to as the control-to-data bundling constraint. Note that there can be more or fewer stages in the FIFO than is shown in FIG. 2A. Such a flow-through FIFO functions as a phase-buffer between clocked modules because each stage of the FIFO operates in less than one clock cycle. The difference between the delay of one stage of FIFO and the clock period is the amount of phase buffering each stage of the FIFO can provide.

FIG. 2B illustrates an exemplary sticky buffer 207. Sticky buffer 207 includes inverters 250 and 252 coupled back-to back, which forms a latch. Note that inverter 252 is smaller than inverter 250, thus the output of inverter 252 can be easily overridden by an external input to inverter 250. Inverter 254 restores the output polarity of sticky buffer 207 to match the input polarity of sticky buffer 207.

Exemplary prior art solutions are described by William J. Dally and John W. Poulton in *Digital Systems Engineering*, Cambridge University Press, 1998, pages 470-485. Note that on page 475, the authors describe the task of phase-buffering as "synchronizing a mesochronous signal." The task is not really "synchronizing," but the circuits used are very similar to those used when synchronization is carried out, thus the authors included them in the synchronizer design section. Notice that the FIFO designs shown in this text are ring-buffer FIFOs rather than the flow-through FIFOs. Either style will work.

Determining the proper depth for the FIFO is critical. The FIFO must have sufficient stages to ensure that the FIFO will not overflow, causing loss of data, but must not have too many stages so that data is needlessly held in the FIFO. Furthermore, if the FIFO has too few stages, it is possible to inadvertently empty it thus causing erroneous data to be read by the receiver. Thus, a phase buffer circuit design that offers more phase buffering per stage will have the advantage that it will require fewer stages to achieve a specified amount of phase buffering.

Use of a FIFO as a phase buffer has several drawbacks. The primary issue is managing the control-to-data bundling constraint. Extra delay margin must be added into the forward control path of the FIFO to guarantee that the bundling constraint is satisfied over all operating conditions. This extra delay slows down each FIFO stage, reducing its effectiveness at phase buffering and thus more stages will be required to achieve the specified amount of phase buffering.

Another issue with the use of FIFOs occurs when the input data bits are spatially distributed, which occurs, for example, when the input data comes from input pins of a chip. This can result in running long wires to bring all the bits together to deliver the data to the FIFO, thus adding delay to each data bit proportional to the length of its wire. This additional delay subtracts from the phase buffering capability of the first stage of the FIFO. Alternatively, multiple 1-bit wide FIFOs can be used, one FIFO for each input data bit. This can reduce the wire lengths, and thus reduce additional delays. However, although flow-through FIFO stages, such as shown in FIG. 2A, are small, use of multiple 1-bit FIFOs also duplicates the control circuits.

Hence, what is needed is an apparatus and a method for phase-buffering of signals between a source and a destination within a computer system, which do not have the problems described above.

SUMMARY

One embodiment of the present invention provides a system that facilitates phase-buffering on a bit-by-bit basis using a control queue. The system includes a control queue, wherein a stage in the control queue is configured to accept both a first control signal and a second control signal, wherein the first control signal and the second control signal are mutually exclusive, wherein the first control signal being asserted indicates the value of a corresponding data bit is zero, while the second control signal being asserted indicates the value of the corresponding data bit is one. A forward-transfer mechanism couples the first control signal or the second control signal from the input of the stage through storage elements to the output of the stage. A reverse transfer mechanism which accepts an acknowledgement signal at the output of the stage and transfers the acknowledgement signal through a storage element to the input of the stage.

In a variation of this embodiment, stages for each bit of the control queue are evenly distributed between a data transmitter and a data receiver, and wherein the data transmitter sends the bit to the phase-buffer and the data receiver takes the bit from the phase buffer.

In a variation of this embodiment, a control queue stage is comprised of asP* circuitry.

In a further variation, the asP* circuitry includes four forward gate delays, six reverse gate delays, and three inversion loops.

In a further variation, the control queue is comprised of one or more balanced asP* queue stages.

In a further variation, a balanced asP* stage provides six forward gate delays, six reverse gate delays, and five inversion loops.

In a further variation, the control queue is comprised of one or more fast asP* queue stages.

In a further variation, a fast asP* stage provides four forward gate delays, four reverse gate delays, and three inversion loops.

BRIEF DESCRIPTION OF THE FIGURES

FIG. 2B illustrates an exemplary sticky buffer.

FIG. 3 illustrates three stages of a 2-way control queue in accordance with an embodiment of the present invention.

FIG. 4A illustrates a symbol for a GasP implementation of a 2-way control queue stage in accordance with an embodiment of the present invention.

FIG. 4B illustrates a GasP implementation of a 2-way control queue stage in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Overview

An asynchronous control queue can be thought of as the control portion of a linear FIFO that has no data path. A two-way control queue takes events from a source that can produce two different types of events, and passes these events down the queue from stage to stage while preserving the full order of the input events. Thus, if events are delivered to the queue in the order a, b, a, a, b, b, they will be delivered at the output of the queue in exactly the same order. Like a FIFO, the queue offers internal storage at each stage, so that multiple events can be buffered in the queue. Asynchronous handshake signals are used to communicate between the queue stages. Full delay-insensitive asynchronous communication of these events from stage to stage requires that each input event is acknowledged before the next input event may be issued. These acknowledge events may be sent over a common wire to sequence the input events.

Data bundled with its validity signal can be converted into control signals to send into a control queue. At the output of the queue, the control events can be converted back into bundled data values with a validity signal. These validity signals can be clock signals when the queue is used as a phase buffer between two clock domains of the same frequency derived from a single clock source.

For really high-speed asynchronous circuit implementations, GasP circuits offer the best performance. Note that GasP modules are described in U.S. Pat. No. 6,607,317 B2 granted to Ebergen et al., which is incorporated herein by reference. However, GasP circuits use custom gates and bi-directional wires. In contrast, their predecessor, asP* circuits, although slightly slower, use standard gates, unidirectional wires, and are more robust. Thus, asP* circuit implementations are more suitable for use as phase-buffers. asP* circuits are described in U.S. Pat. No. 5,937,177 granted to Molnar et al., which is incorporated herein by reference.

Figure 16:
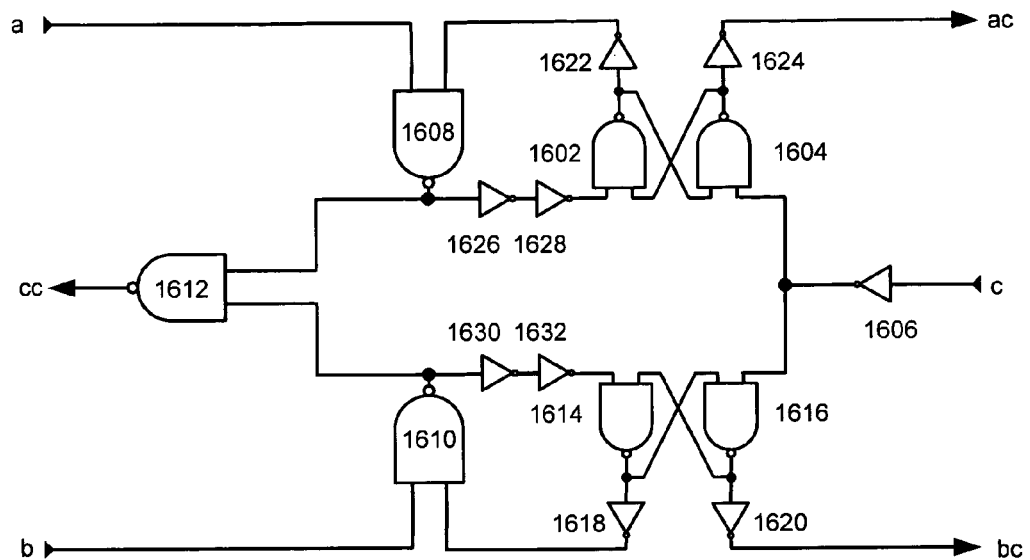
FIG. 16 illustrates a balanced asP* control queue stage with NAND SR flip-flops in accordance with an embodiment of the present invention.
Figure 17A:
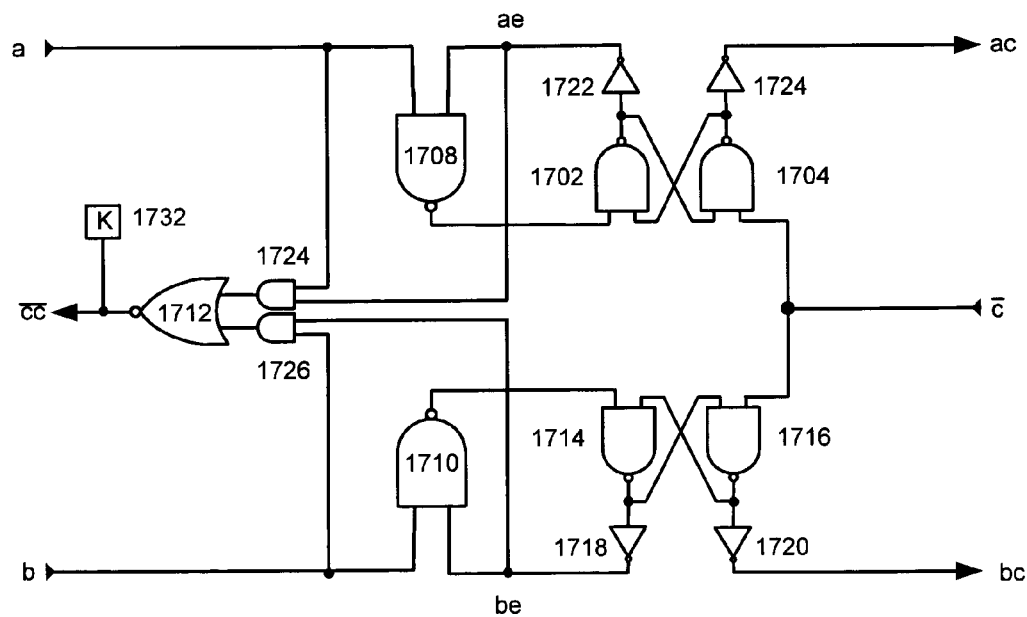
FIG. 17A illustrates a fast asP* control queue stage in accordance with an embodiment of the present invention.
Figure 17B:
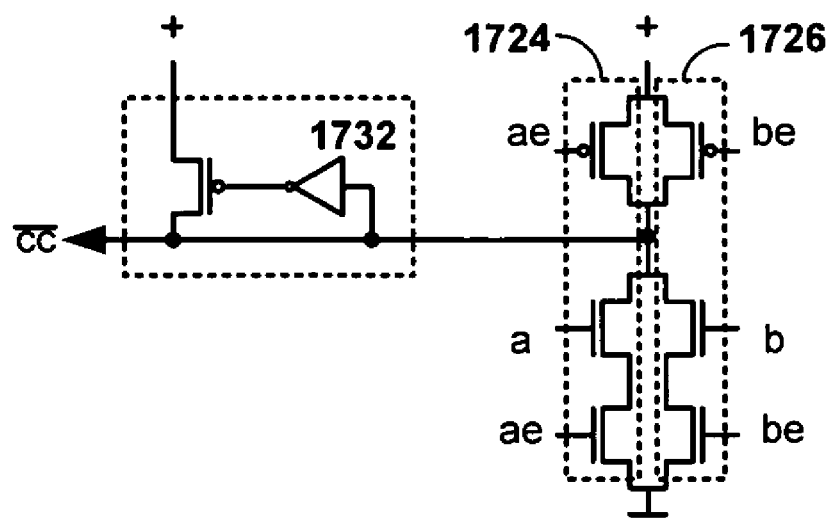
FIG. 17B illustrates an implementation of selected circuit elements in accordance with an embodiment of the present invention.

Presented herein are several queue stage implementations that have different speed and circuit complexity. For high-speed operation, the design presented below in FIGS. 17A and 17B is the most suitable, while for a slower, but very robust implementation, the design presented below in FIG. 16 is favored.

2-Way Control Queue

FIG. 3 illustrates three stages of a 2-way control queue in accordance with an embodiment of the present invention. Stages 302, 304, and 306 form a control queue which operates as follows. And input is delivered to either the upper input $U_i$ or the lower input $L_i$ of the queue, but not both. Receipt of the input event by the first stage is acknowledged by generating an $A_i$ signal. The event is propagated forward from stage to stage in FIFO fashion to the output of the queue, generating either a $U_o$ output signal, if the input was a $U_i$, or an $L_o$ output signal, if the input was an $L_i$.

Upon receipt of an $A_o$ acknowledge signal, the event is then deleted from the queue. The queue can store one event per stage—either an upper or a lower event. In FIG. 3, the filled-in triangles by the acknowledge inputs of the stages indicate the initial condition of the queue. The queue is initialized empty and ready to receive an input event. When a stage is full, it will not send an input acknowledge signal to its predecessor stage until after it has received an output acknowledge signal form its successor stage. In this way, the queue can fill with as many events as it has stages. The input events, $U_i$ and $L_i$, must be mutually exclusive and sequenced by $A_i$ signals. The upper half and the lower half of each stage are mutually exclusive, but both halves share a common acknowledge signal.

Figure 1:
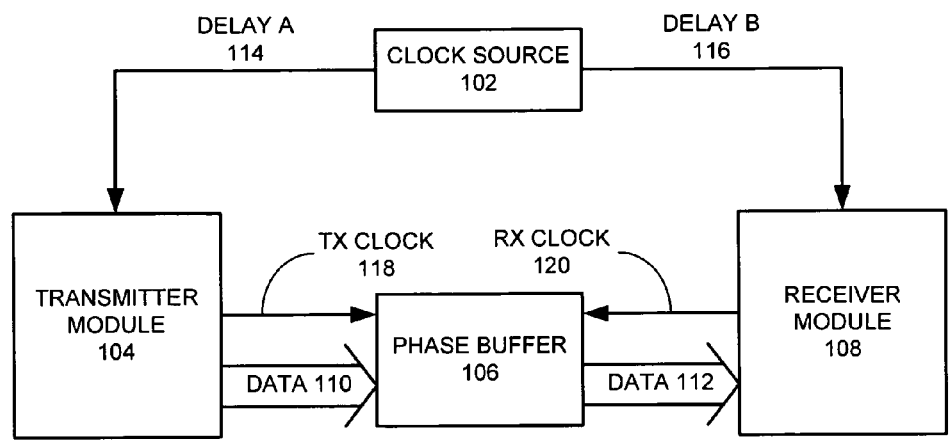
FIG. 1 illustrates a phase buffer interposed between a transmitter module and a receiver module.
Figure 2A:
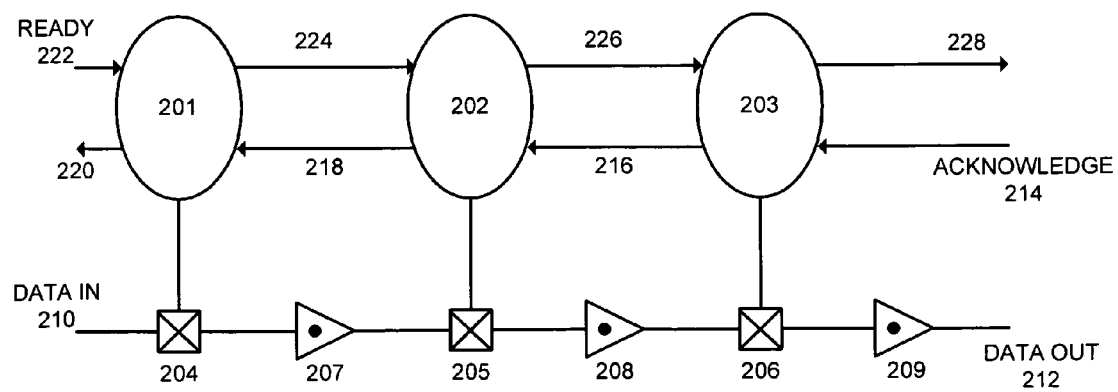
FIG. 2A illustrates a typical 3-stage flow-through FIFO.

In an asynchronous queue, a data bit is encoded as one of two forward-going signals, as in FIG. 3, $U_i$ or $L_i$. There is no data bundling as described above in reference to the pass-through FIFO of the prior art in FIG. 2A, and thus, no bundling delay constraint to be met. Thus, a queue circuit is more delay-insensitive than a FIFO, and so the queue is a more robust solution than a FIFO.

Queue Element in GasP

FIG. 4A illustrates a symbol 402 for a GasP implementation of a 2-way control queue stage in accordance with an embodiment of the present invention. During operation, control stage 402 receives either input A or input B. Receipt of the A or B input is acknowledged by generating output CC. The received input signal, either A or B, is presented to a succeeding stage as either output AC or output BC, respectively. In response, the receiving mechanism provides acknowledgement signal C. This signal is presented to the previous stage as acknowledgement CC.

FIG. 4B illustrates a GasP implementation of 2-way control queue stage 402 in accordance with an embodiment of the present invention. Inputs of GasP join modules 404 and 406 are indicated by an associated triangle, while outputs have no triangle. Keepers 408, 410, and 412 maintain the logic values on the wires, that we call state conductors, when they are not driven. The arrow in GasP join modules 404 and 406 indicate the forward control direction. Note that most GasP modules are asymmetric and have different forward and reverse delay values.

The mutual exclusion of input events A and B causes either GasP join module 404 or 406 to fire, but never both. Output CC is produced by the wire-OR of outputs from GasP join modules 404 and 406. Input C is connected to both of the GasP modules, an thus a C input event will enable both GasP join modules 404 and 406. However, only one module will fire, because inputs A and B are mutually exclusive, and upon firing will self-reset its input connected to the C input signal. Thus, it will renege on the primed input of the other GasP join module, disabling both GasP join modules until the next C input event. Thus, internally, this queue stage implementation is not delay-insensitive. However, from its terminals, this implementation is almost delay insensitive. There are some minimum delay constraints that must be satisfied for correct operation. For example, in the event sequence A, CC, B, the B event must be sufficiently delayed after the CC event to permit the self-reset of the C input to complete—an easy delay constraint to satisfy when similar queue stages are cascaded.

Queue Element Specification

Figure 5:
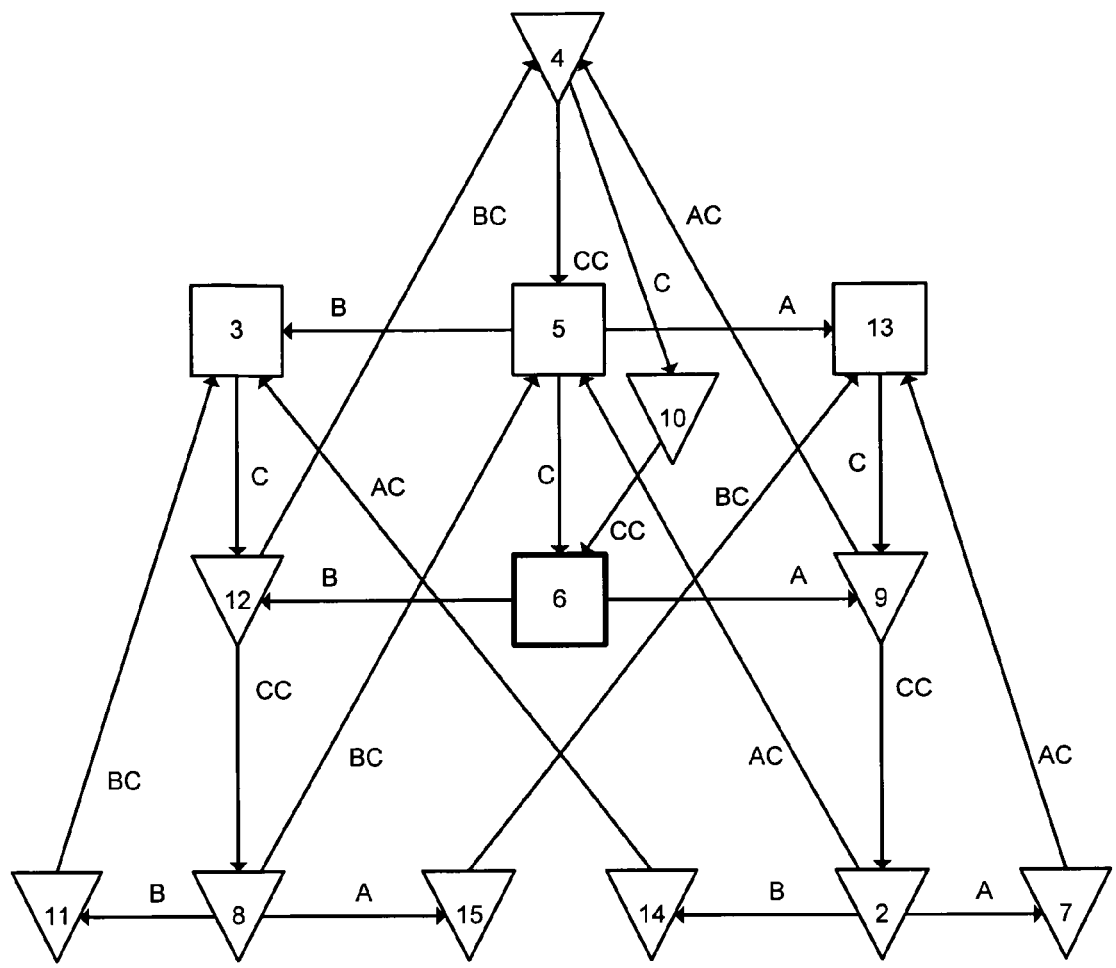
FIG. 5 illustrates a state graph specification of a 2-way control queue stage in accordance with an embodiment of the present invention.

FIG. 5 illustrates a state graph specification of a 2-way control queue stage in accordance with an embodiment of the present invention. Operation of 2-way control stage 402 is described by the delay-insensitive specification state graph shown in FIG. 5. This state graph contains two types of states: indifferent (or box states), shown as squares, and transient (or nabla states), shown as triangles that are point-down. Indifferent nodes represent states with neither input nor output obligation, while transient nodes represent states with an output obligation—to be fulfilled by the system when no input is received.

This state graph is surprisingly complicated for such a simple element, but the complexity arises from the concurrency that is possible. The initial state is state number 6 in the middle of the graph, indicated by the thicker box outline. In queue element 402, of FIG. 4A, this initial state is indicate by the combination of hollow and filled-in triangles by each input.

The filled-in triangle by the C input indicates that the C input is primed, i.e., the stage starts in a state as if the C input has already been received. Upon receipt of either an A input event or a B input event, but not both, the queue element will fire and generate a CC output event and concurrently either an AC output event or a BC output event. This is illustrated in the state graph where from state 6, receipt of an A event goes to state 9 after which the queue element outputs both AC and CC concurrently going to state 5 via state 2 or 4. Similarly, receipt of a B input in the initial state goes to state 12 after which the queue element outputs both BC and CC concurrently going to state 5 via states 8 or 4. Note that from state 4, if the C input is received before the CC output is generated, then the machine returns to the initial state via state 10 rather than state 5.

The lower six states of the graph specify how the machine behaves when the CC output is generated before either an AC or BC output is generated. In states 2 and 8, either a second A or a second B input is permitted. States 13 and 3 correspond to when the stage has received an A or B input, respectively, and is waiting or a C input form the following stage to declare that it is empty.

An implementation of the queue stage must contain sufficient storage elements to record the receipt of an A input, a B input, or that neither has yet been received. Thus a minimum of two bits of internal storage are required.

asP* FIFO Stage

Figure 6:
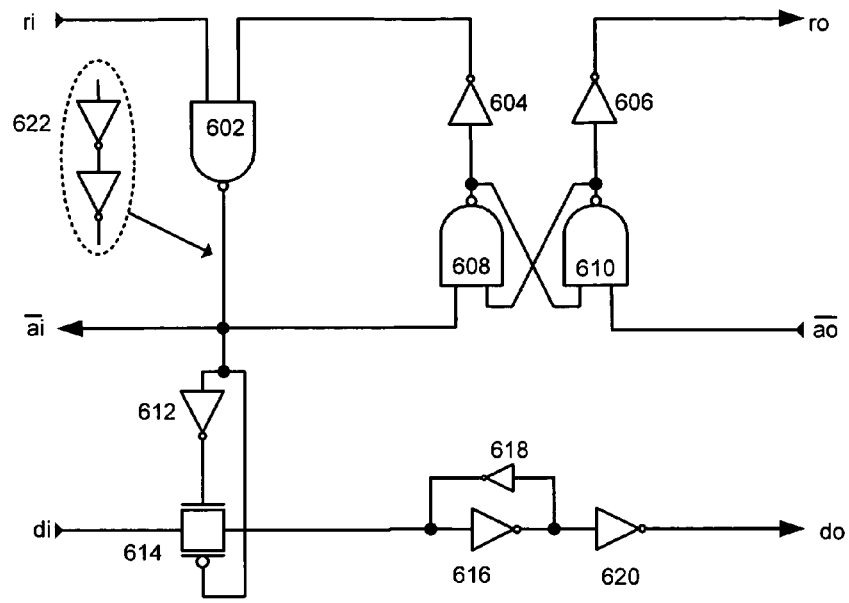
FIG. 6 illustrates an asP* FIFO stage in accordance with an embodiment of the present invention.

FIG. 6 illustrates an asP* FIFO stage in accordance with an embodiment of the present invention. In some extant computer systems, there is a need for a 1-bit wide phase buffer. One way to implement these phase buffers is to use 1-bit wide FIFOs. Alternatively, these phase buffers can be implemented using asynchronous control queues. A linear asP* FIFO is a good choice for implementing a 1-bit wide FIFO because it is a small, fast, and easily scalable circuit.

The asP* FIFO stage presented in FIG. 6 uses the bundled data convention. The data values are bundled with the control signals and validity of the input data $d_i$ is indicated by control input $r_i$ going high. The rule with such bundling constraints is that the forward control signal path must have the same delay or greater than that of the data path. As shown, this circuit has a minimum cycle time of eight gate delays. However, it has three inversion loops in the control path, which is a concern for reliable operation of the pass-gates in the data path. Addition of two inverters 622 placed on the output of NAND gate 602, as indicated by the inverters in the dashed oval in the figure, results in five-inversion loops with a minimum cycle time of twelve gate delays. This slower circuit is thus much more robust, not only because five gate delay pulses operate the pass-gates, but also because there is now a wider margin between the control and data path delays that make the bundling constraint easier to satisfy.

The control path of the asP* FIFO stage comprises NAND gates 602, 608, and 610 and inverters 604 and 606. The data path comprises pass-gate 614, and inverters 612, 616, 618, and 620.

The initialization of the control path places highs on both inputs of NAND gate 608. The resulting low at the output of NAND gate 608 is coupled to the left-hand input of NAND gate 610. The right-hand input of NAND gate 610 is typically held high by the following control stage. The low input to NAND gate 610 holds its output high. Note that NAND gates 608 and 610 are cross-coupled and form a flip-flop.

The high output of NAND gate 610 is inverted by inverter 606 and provides $r_o$ to the next stage. The low output of NAND gate 608 is inverted by inverter 604 and the resulting high is coupled to the right-hand input to NAND gate 602. The left-hand input to NAND gate 602 is held low by the preceding stage. The output from NAND gate 602 is also provided to pass-gate 614. Pass gate 614 is comprised of an N-type transistor and a P-type transistor. The signal from NAND gate 602 to the N-type transistor is inverted by inverter 612, thus pass-gate 614 is off when the output of NAND gate 602 is high.

When data is applied to $d_i$ by the preceding stage, the preceding stage applies a high to $r_i$. This high, along with the high from inverter 604 causes the output of NAND gate 602 to go low. This low is applied to pass-gate 614 both directly and through inverter 612 to turn on pass-gate 614. $d_i$ is then coupled to inverter 616. The output of inverter 616 is coupled back to the input of inverter 616 through inverter 618 to form a latch. Note that inverter 618 is much smaller than inverter 616, thus can be easily overridden by input $d_i$. Inverter 620 inverts the output of inverter 616 so that the sense of output $d_o$ matches that of input $d_i$ because there are an even number of inversions between input $d_i$ and output $d_o$.

The output of NAND gate 602 is provided to the previous stage as $\overline{a_i}$ to acknowledge receipt of $d_i$ and ultimately cause input $r_i$ to go low. The output of NAND gate 602 is also provided to the left-hand input to NAND gate 608 resulting in the output of NAND gate 608 going high. This high is coupled to the left-hand input of NAND gate 610. If the following stage has acknowledged its previous input, $\overline{a_o}$ is high. Highs on both inputs of NAND gate 610 causes the output of NAND gate 610 to go low. This low is inverted by inverter 606 which sets $r_o$ high signaling the next stage that data $d_o$ is available. Note that the delay through the control path must be greater than the delay through the data path for the system to work properly.

The low output of NAND gate 610 is also provided to the right-hand input of NAND gate 608 to prevent the output of NAND gate 608 from going low until the following stage has set $\overline{a_0}$ to high. The high output from NAND gate 608 is also applied to inverter 604. The resulting low from inverter 604 is applied to the right-hand input of NAND gate 602 causing the output of NAND gate 602 to go high. This high will reset the circuit to its quiescent state.

asP* Control Queue Implementation

Figure 7:
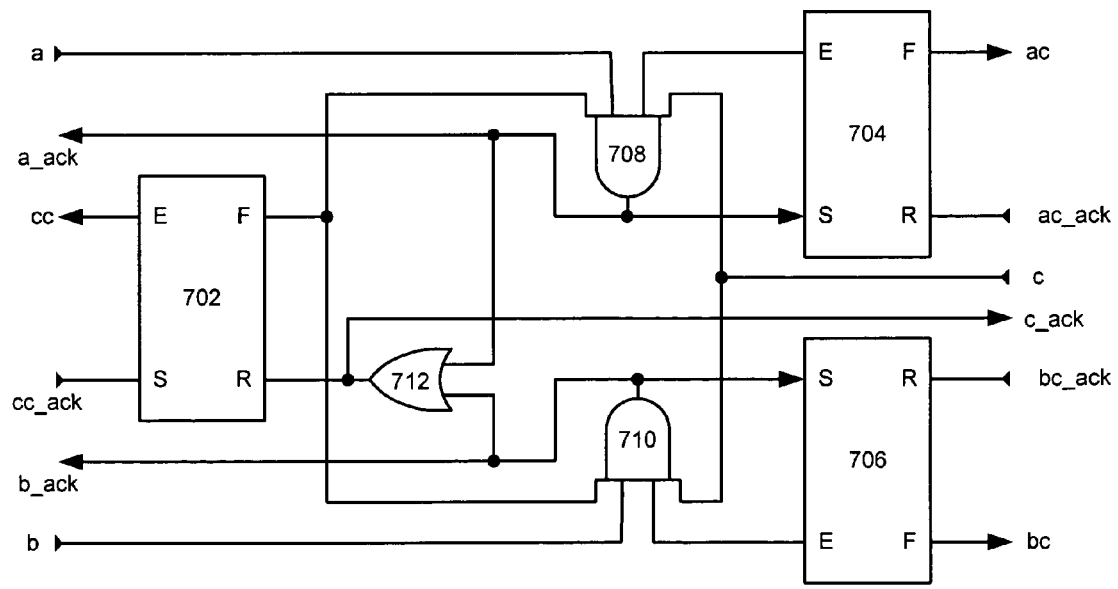
FIG. 7 illustrates an asP* implementation of a 2-way control queue stage in accordance with an embodiment of the present invention.

FIG. 7 illustrates an asP* implementation of a 2-way control queue stage in accordance with an embodiment of the present invention. This implementation comprises SR flip-flops 702, 704, and 706, AND gates 708 and 710, and OR gate 712. Flip-flops 702, 704, and 706 start in the reset state so that the E output of each flip-flop is high. c is set high by the succeeding stage, thus the two right-hand inputs of AND gate 708 and AND gate 710 are high. cc is set high and presented to the preceding stage.

The low output at the "F" terminal of SR flip-flop 702 is applied to both AND gate 708 and AND gate 710. The resulting low from both of these AND gates is applied to OR gate 712. The low output of OR gate 712 is presented to the following stage as c_ack. The output of AND gate 708 and AND gate 710 is also sent to the previous stage as a_ack and b_ack, respectively, to clear the a or b input, whichever is set.

During operation, the previous stage will set either a or b, but not both, high. The previous stage also sets cc_ack high. In response, SR flip-flop 702 is set causing its "F" output to go high, which applies a high to both AND gate 708 and AND gate 710 and sets cc low. If a is high, the output of AND gate 708 is set high and if b is high the output of AND gate 710 is set high.

The resulting high will set either SR flip-flop 704 or SR flip-flop 706 causing either ac or bc to go high, depending on the input. This high from either AND gate 708 or AND gate 710 is also applied to OR gate 712. The resulting high from OR gate 712 is applied to SR flip-flop 702, which resets SR flip-flop 702 and brings cc high signaling the previous stage that the a or b input has been accepted and that a new a or b can be applied. The high from OR gate 712 is also applied to the following stage via c_ack to signal the following stage that data is available.

The low output from F of SR flip-flop 702 resulting after its reset is applied to both AND gate 708 and AND gate 710 causing the output of both AND gates to be low. When the following stage has accepted its input, it responds with either ac_ack or bc_ack, which resets SR flip-flops 704 and 706. After the following stage is ready to accept new input, it sets c high which brings the circuit back to its starting state.

Simplified asP* Control Queue Implementation

Figure 8:
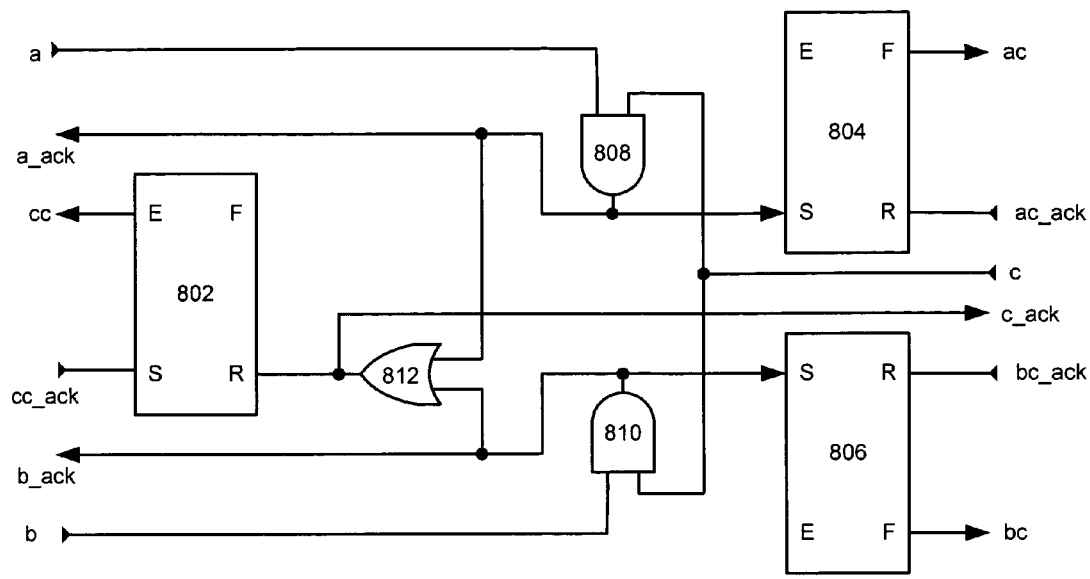
FIG. 8 illustrates a simplified implementation of a 2-way control queue stage in accordance with an embodiment of the present invention.

FIG. 8 illustrates a simplified implementation of a 2-way control queue stage in accordance with an embodiment of the present invention. The implementation comprises SR flip-flops 802, 804, and 806, AND gates 808 and 810, and OR gate 812. This simplified implementation does not use the multiple feedback paths provided in the implementation of FIG. 7. Specifically, AND gates 808 and 810 are two-input AND gates and do not receive inputs from SR flip-flops 804 and 806, respectively, and neither receive inputs from SR flip-flop 802 because these signals are redundant. The operation is similar to the operation of the circuit in FIG. 7 and will not be described further. Note that the inputs and outputs are the same as described for FIG. 7.

SR Flip-Flop Implementation

Figure 9:
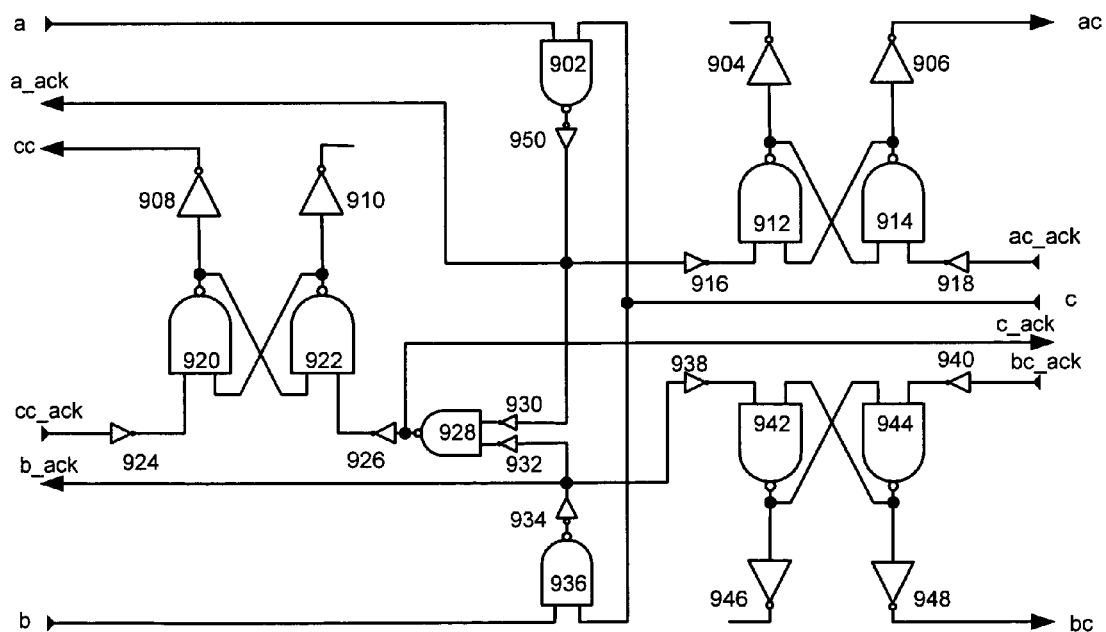
FIG. 9 illustrates an asP* control queue stage with NAND SR flip-flops in accordance with an embodiment of the present invention.

FIG. 9 illustrates an asP* control queue stage with NAND SR flip-flops in accordance with an embodiment of the present invention. This circuit is a direct implementation of the circuit of FIG. 8. SR flip-flop 802 has been replaced by NAND gates 920 and 922, and inverters 908, 910, 924, and 926. SR Flip-flop 804 has been replaced by NAND gates 912 and 914, and inverters 904, 906, 916, and 918. SR Flip-flop 806 has been replaced by NAND gates 942 and 944, and inverters 938, 940, 946, and 948. AND gate 808 has been replaced by NAND gate 902 and inverter 950, AND gate 810 had been replaced by NAND gate 936 and inverter 934, and OR gate 812 has been replaced by NAND gate 928 and inverters 930 and 932. The operation of this circuit and the input and output signals is similar to the operation of the circuit in FIG. 7 as described above. This circuit has a minimum cycle time of 14 gate delays. The forward path for both a to ac and b to bc each have 6 gate delays, while the reverse control path c to cc has 8 gate delays.

Optimized asP* Control Queue Stage

Figure 10:
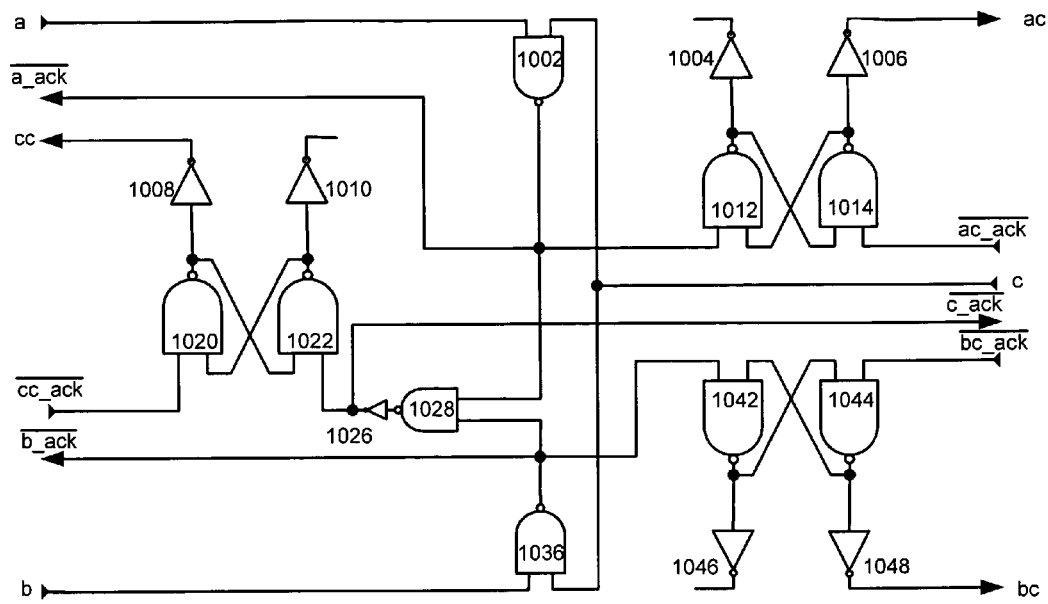
FIG. 10 illustrates an optimized asP* control queue stage with NAND SR flip-flops in accordance with an embodiment of the present invention.

FIG. 10 illustrates an optimized asP* control queue stage with NAND SR flip-flops in accordance with an embodiment of the present invention. The implementation illustrated in FIG. 10 includes NAND gates 1012, 1014, 1020, 1022, 1042, 1044, 1002, 1028, and 1036, and inverters 1008, 1010, 1026, 1004, 1006, 1046, and 1048.

This implementation brings the minimum cycle time down to 10 gate delays by removing redundant inverters from the implementation in FIG. 9. The forward paths a to ac and b to bc each have 4 gate delays while the reverse control path c to cc has 6 gate delays. Note that in this implementation, signals a_ack, cc_ack, b_ack, ac_ack, c_ack, and bc_ack become $\overline{\text{a\_ack}}$, $\overline{\text{cc\_ack}}$, $\overline{\text{b\_ack}}$, $\overline{\text{ac\_ack}}$, $\overline{\text{c\_ack}}$, and $\overline{\text{bc\_ack}}$, respectively.

A Further Optimized asP* Control Queue Stage

Figure 11:
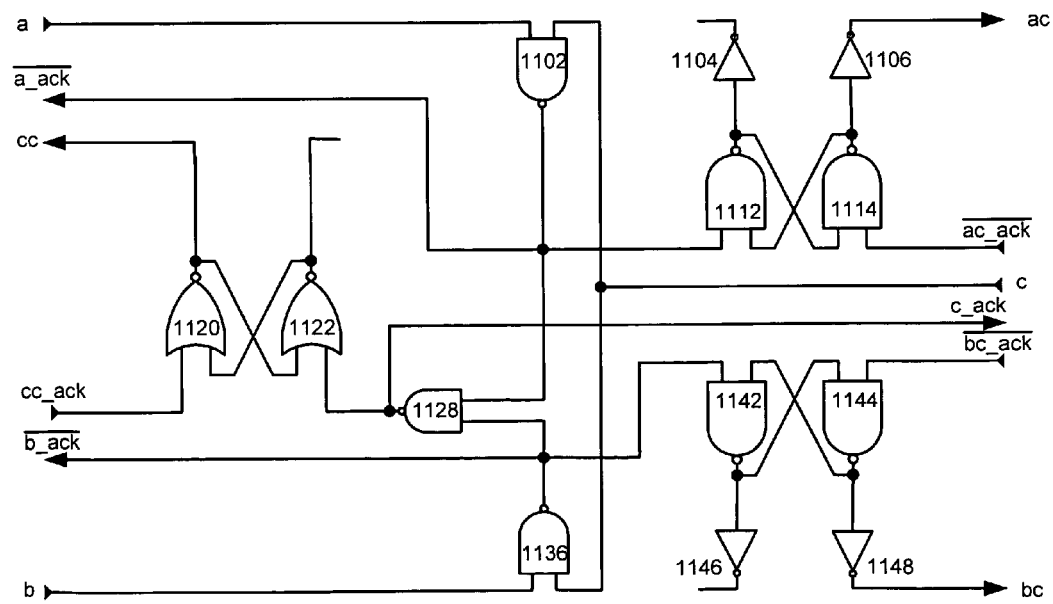
FIG. 11 illustrates a further optimized asP* control queue stage in accordance with an embodiment of the present invention.

FIG. 11 illustrates a further optimized asP* control queue stage in accordance with an embodiment of the present invention. The implementation illustrated in FIG. 11 includes NAND gates 1112, 1114, 1142 and 1144, NOR gates 1120 and 1122, NAND gates 1102, 1128, and 1136, and inverters 1104, 1106, 1146, and 1148. This implementation reduces the minimum cycle time to 8 gate delays by using cross coupled NOR gates 1120 and 1122 rather than the NAND gates and the associated inverters for the SR flip-flop.

A Simpler Control Queue Stage

Figure 12:
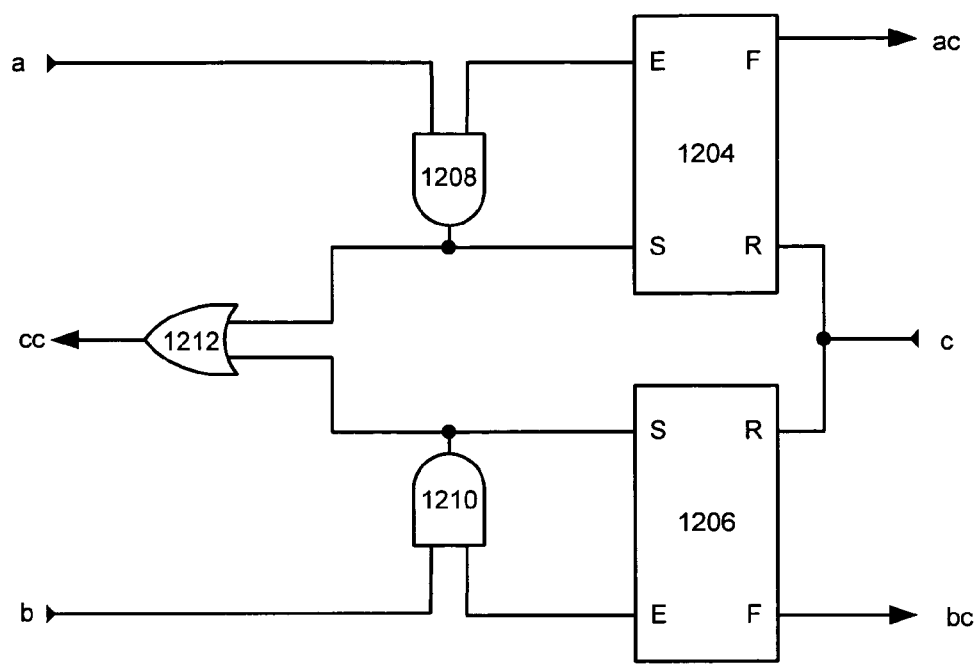
FIG. 12 illustrates a simpler control queue stage implementation in accordance with an embodiment of the present invention.

FIG. 12 illustrates a simpler control queue stage implementation in accordance with an embodiment of the present invention. In FIGS. 7 to 11, the acknowledge events on cc are the sum of the acknowledge events on a_ack and b_ack. Also, for every event on ac_ack or bc_ack there will be an event on c. Because of the mutual exclusion of events on a and b, there is also mutual exclusion of events on ac and bc. Only one of the two flip-flops generating ac and bc will be set at a time. Thus, applying reset to both of these flip-flops concurrently will reset whichever one that was set, and the reset will be ignored by the other, which is already in the reset state.

The circuit shown in FIG. 12 takes advantage of these observations and provides effective control using SR flip-flops 1204 and 1206, AND gates 1208 and 1210, and OR gate 1212. In this circuit, when a or b is applied and the state of SR flip-flops 1204 and 1206 is empty, the associated AND gate, 1208 or 1210, will set its output to high. This high, for example from AND gate 1208, sets SR flip-flop 1204 and provides ac to the following stage.

The high from the AND gate is also sent to OR gate 1212 which sets its output, cc, to high to acknowledge the input. After the following stage has accepted ac or bc, it sets c high which resets SR flip-flop 1204 or 1206, whichever was set by the input signal.

A Simpler Control Queue Stage with NAND SR Flip-Flops

Figure 13:
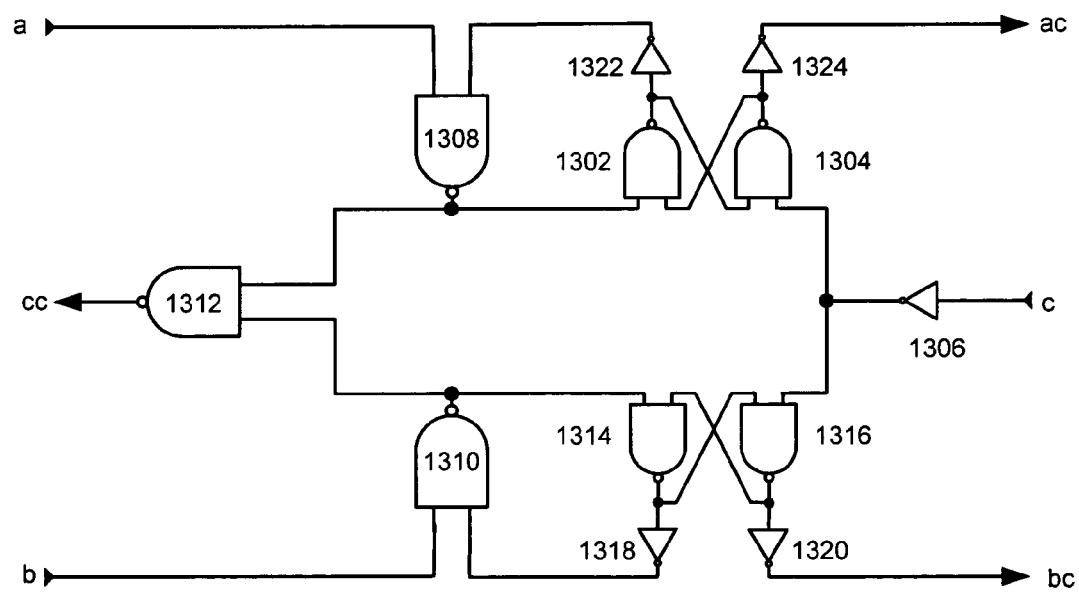
FIG. 13 illustrates a simpler asP* control queue stage with NAND SR flip-flops in accordance with an embodiment of the present invention.

FIG. 13 illustrates a simpler asP* control queue stage with NAND SR flip-flops in accordance with an embodiment of the present invention. The circuit illustrated in FIG. 13 is a direct implementation of the circuit of FIG. 12 using cross-coupled NAND gates for the SR flip-flops with redundant inverters optimized out. SR flip-flop 1204 is replaced by NAND gates 1302 and 1304 and inverters 1322 and 1324. SR flip-flop 1206 is replaced by NAND gates 1314 and 1316 and inverters 1318 and 1320. AND gates 1208 and 1210 are replaced by NAND gates 1308 and 1310, while OR gate 1212 is replaced by NAND gate 1312. Inverter 1306 provides inversion for input c. The minimum cycle time for this circuit is 10 gate delays. The delay from a to ac and b to bc is 4 gate delays while the delay from c to cc is 6 gate delays.

A Slower asP* Control Queue Stage

Figure 14:
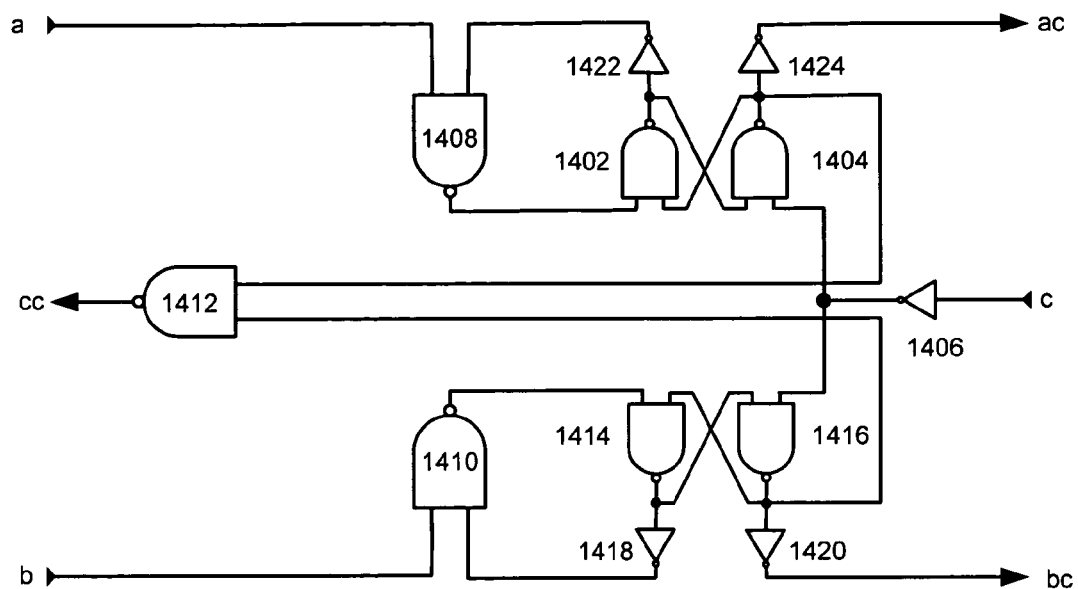
FIG. 14 illustrates a slower asP* control queue stage in accordance with an embodiment of the present invention.

FIG. 14 illustrates a slower asP* control queue stage in accordance with an embodiment of the present invention. In this circuit, SR flip-flop 1204 of FIG. 12 is replaced by NAND gates 1402 and 1404 and inverters 1422 and 1424. NAND gate 1412 performs and equivalent function to NAND gate 1312, NAND gate 1412 gets inputs from the outputs of NAND gates 1404 and 1416, rather than the outputs of NAND gates 1408 and 1410. The minimum cycle time of this circuit is 12 gate delays.

Transition Control Queue Stage

Figure 15:
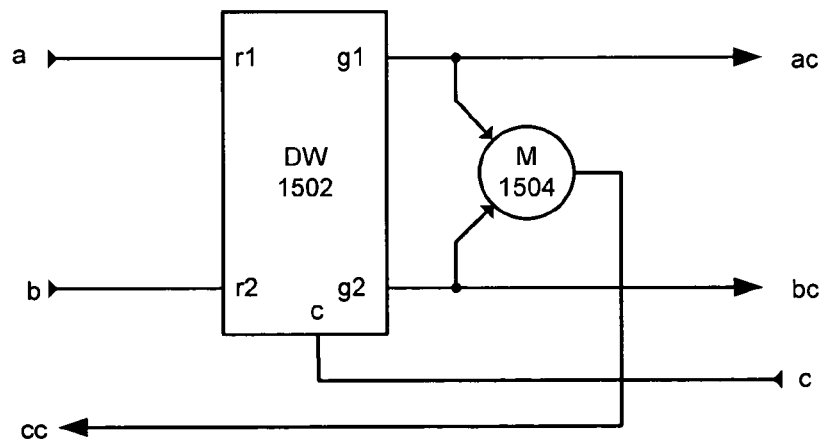
FIG. 15 illustrates a transition control queue stage implementation in accordance with an embodiment of the present invention.

FIG. 15 illustrates a transition control queue stage implementation in accordance with an embodiment of the present invention. In this implementation, both the rising and the falling signal transitions signify control events. The circuit illustrated in FIG. 15 includes a decision-wait 1502 and a merge element 1504. Upon receiving either input a or input b, if c indicates that the following stage is ready to accept input, the input is transferred to ac or bc, depending on the input. ac and bc are merged into cc in merge element 1504 to signal the previous stage that the input has been accepted.

Balanced asP* Control Queue Stage

FIG. 16 illustrates a balanced asP* control queue stage with NAND SR flip-flops in accordance with an embodiment of the present invention. The circuit illustrated in FIG. 16 includes NAND gates 1602, 1604, 1608, 1610, 1612, 1614, and 1616 and inverters 1618, 1620, 1622, 1624, 1626, 1628, 1630, and 1632. This circuit operates in a similar manner to the circuit described above with reference to FIG. 13. However, there are two additional inverters in each forward control path. Inverters 1626 and 1628 are in the a control path, while inverters 1630 and 1632 are in the b control path.

This circuit has a total of 12 gate delays, arranged with 6 gate delays in both the forward and reverse directions. Furthermore, all internal loops are five inversion loops, providing more robust circuit operation.

Fast asP* Control Queue Stage

FIG. 17A illustrates a fast asP* control queue stage in accordance with an embodiment of the present invention. The circuit illustrated in FIG. 17A comprises NAND gates 1708, 1710, 1702, 1704, 1714, and 1716, inverters 1722, 1724, 1718, and 1720, AND gates 1724 and 1726, NOR gate 1712 and keeper 1732. This circuit is made faster than the circuit of FIG. 16 by inverting the c and $\overline{cc}$ signals and employing a complex gate to generate the $\overline{cc}$ signal. This implementation has a cycle time of eight gate delays, when counting the delay of the complex gate as one gate delay. This queue stage design is symmetrical, with four gate delays in both the forward and reverse direction, making it about the same speed as an asP* FIFO design such as shown earlier in FIG. 6. This high speed is achieved by having three-inversion loops, making it less robust than five-inversion loop designs.

FIG. 17B illustrates an implementation of the complex gate in accordance with an embodiment of the present invention. This circuit is not a full AND-NOR gate because two pull-up transistors have been omitted. This optimization is possible because of the way the gate is being employed. $\overline{cc}$ is pulled down when either the upper or lower path fires and is pulled up when either flop-flop is full. Keeper 1732 on the $\overline{cc}$ output maintains this output high when the stage is empty and waiting for either an a or b input signal. Note that a half-keeper suffices here as illustrated in FIG. 17B.

Converting Data Bits into Control Signals

Figure 18:
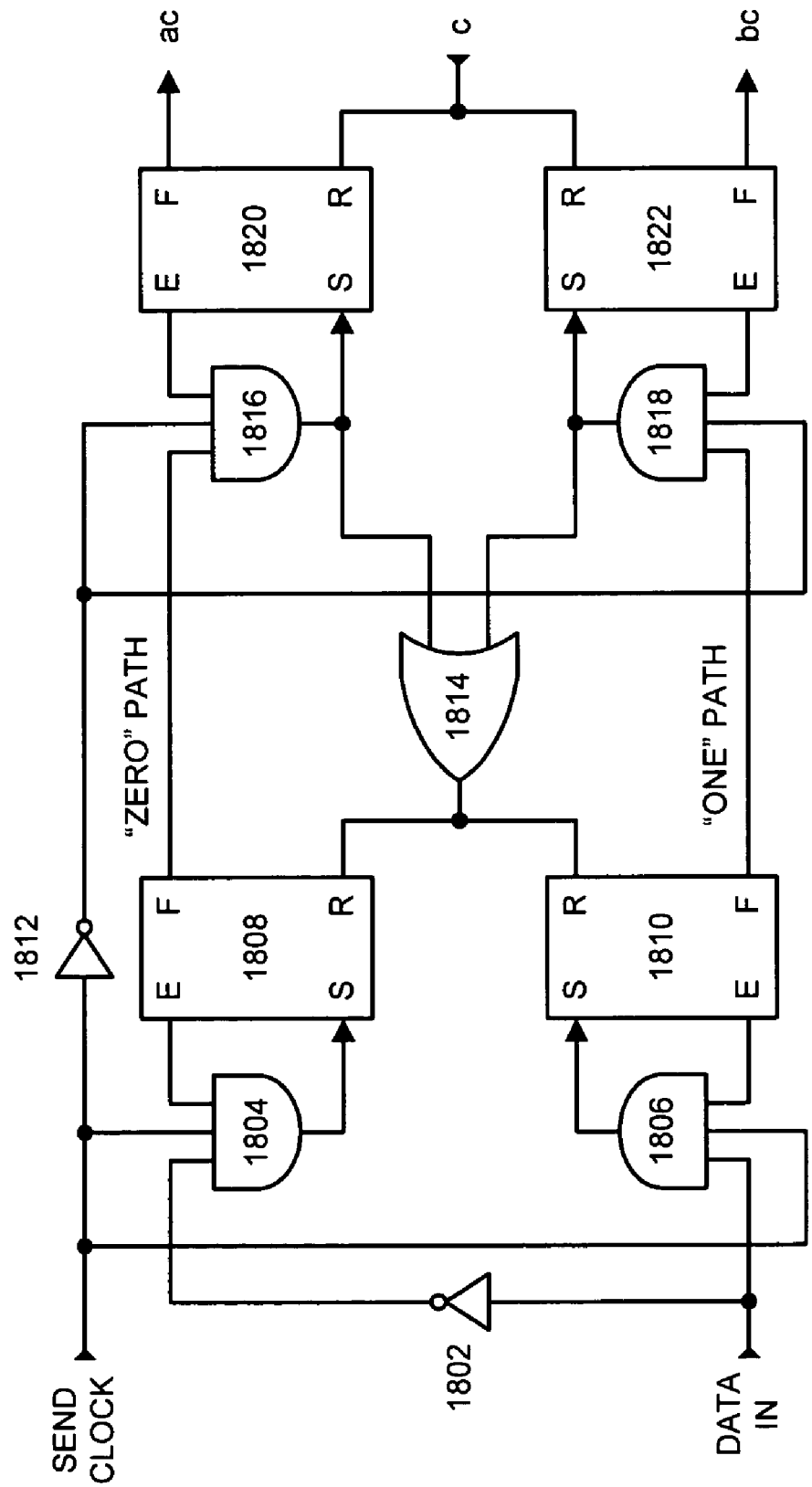
FIG. 18 illustrates converting a data bit into "zero" and "one" control signals for a queue in accordance with an embodiment of the present invention.

FIG. 18 illustrates converting a data bit into "zero" and "one" control signals for a queue in accordance with an embodiment of the present invention. The circuitry illustrated in FIG. 18 can be used to interface with circuitry, such as the circuitry illustrated in FIG. 12 above.

During operation, data in is applied to AND gate 1806 and inverter 1802. The output of inverter 1802 is applied to AND gate 1804. When SR flip-flops 1808 and 1810 are reset, the empty signals from SR flip-flops 1808 and 1810 are applied to AND gates 1804 and 1806, respectively. When the send clock goes high, the output of either AND gate 1804, or AND gate 1806 will go high, depending on the value of data in. If data in is high, SR flip-flop 1810 will be set, and if data in is low, SR flip-flop 1808 will be set. Thus, the lower control path carries a "one" control signal, and the upper path carries a "zero" control signal.

The send clock is also applied to inverter 1812. The output of inverter 1812 is applied to AND gates 1816 sand 1818, which holds the set signals to SR flip-flops 1820 and 1822 low preventing the output of these flip-flops from changing.

The outputs from SR flip-flops 1808 and 1810 are applied to AND gates 1816 and 1818, respectively. The empty signals from SR flip-flops 1820 and 1822 are also applied to AND gates 1816 and 1818, respectively. When the send clock goes low, the high output of inverter 1812 is applied to AND gates 1816 and 1818. Depending on whether the "zero" control signal or the "one" control signal is high, the output of AND gate 1816 or 1818 will go high. This high signal will set either SR flip-flop 1820 or SR flip-flop 1822. This high signal is also applied to OR gate 1814, which will reset SR flip-flops 1808 and 1810.

The F outputs of SR flip-flops 1820 and 1822 are applied to the following stage as "ac" and "bc," respectively. When the following stage accepts the control signals from SR flip-flops 1820 and 1822, the "c" input goes high, both SR flip-flop 1820 and SR flip-flop 1822 are reset.

Converting Control Signals into Data Bits

Figure 19:
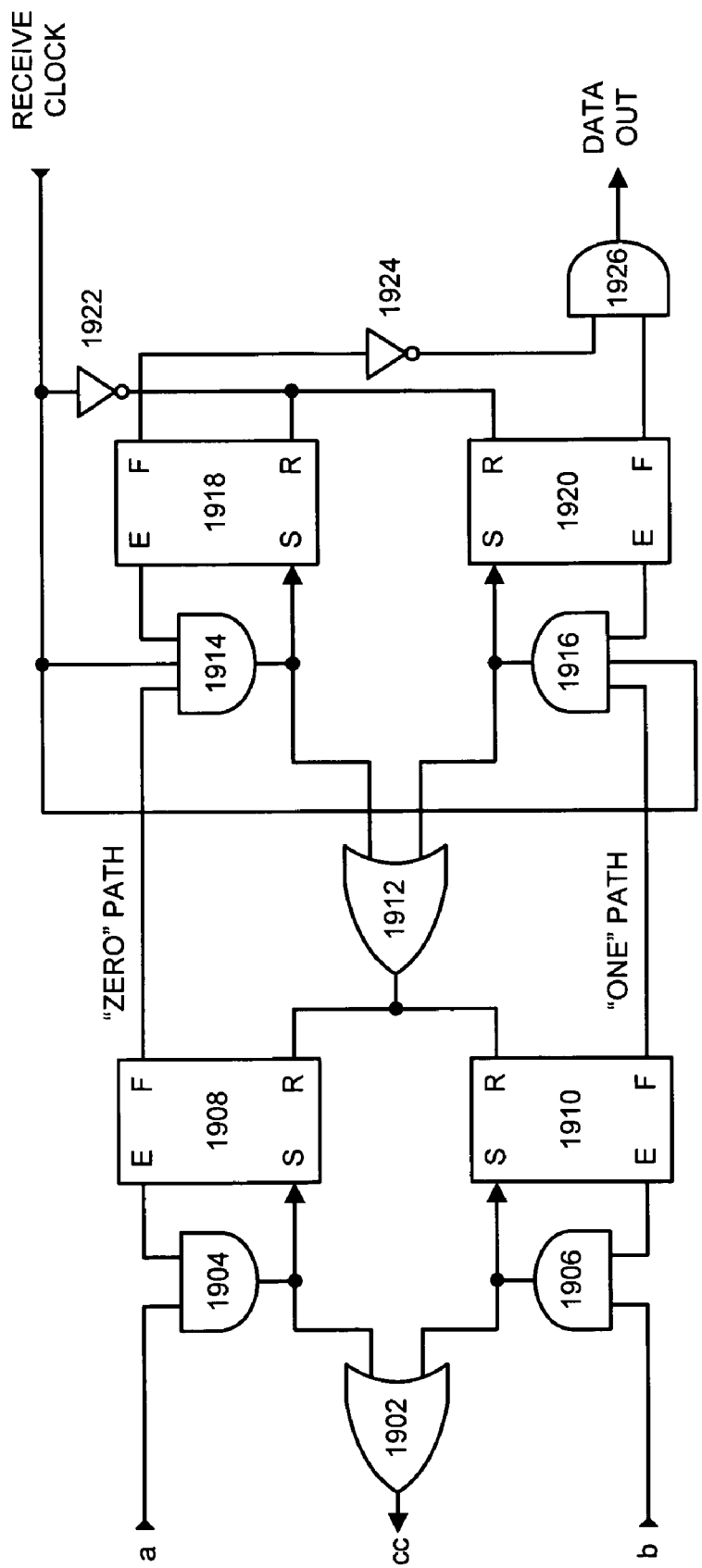
FIG. 19 illustrates converting "zero" and "one" control signals from a queue into a data bit in accordance with an embodiment of the present invention.

FIG. 19 illustrates converting "zero" and "one" control signals from a queue into a data bit in accordance with an embodiment of the present invention. The circuitry illustrated in FIG. 19 can be used to interface with circuitry, such as the circuitry illustrated in FIG. 12 above.

During operation, control signals "a" and "b" are coupled from the preceding stage into AND gates 1904, and 1906, respectively. The "E" signals from SR flip-flops 1908 and 1910 are also coupled to AND gates 1904, and 1906, respectively. Depending on whether the control signal from the previous stage is a "zero" control signal on "a" or a "one" control signal on "b," SR flip-flop 1908 or SR flip-flop 1910 will be set.

The "F" outputs of SR flip-flops 1908 and 1910, and the "E" signals from SR flip-flops 1918 and 1920 are applied to AND gates 1914 and 1916, respectively. When the receive clock goes high, this high is applied to both AND gate 1914 and AND gate 1916. In response, the output of either AND gate 1914 or AND gate 1916 will go high, depending on whether the control signal is a "zero" control signal or a "one" control signal.

The "F" output of SR flip-flop 1920 and the inverted "F" output of SR flip-flop 1918 from inverter 1924 are applied to AND gate 1926. The output of AND gate 1926, which mirrors data in from FIG. 18, is applied to the following stage as data out. When the receive clock goes low, this low is inverted by inverter 1922 and applied to the "R" inputs of SR flip-flops 1918 and 1920, resetting these flip-flops to their empty state.

Phase-Buffering Using Control Queues

Figure 20:
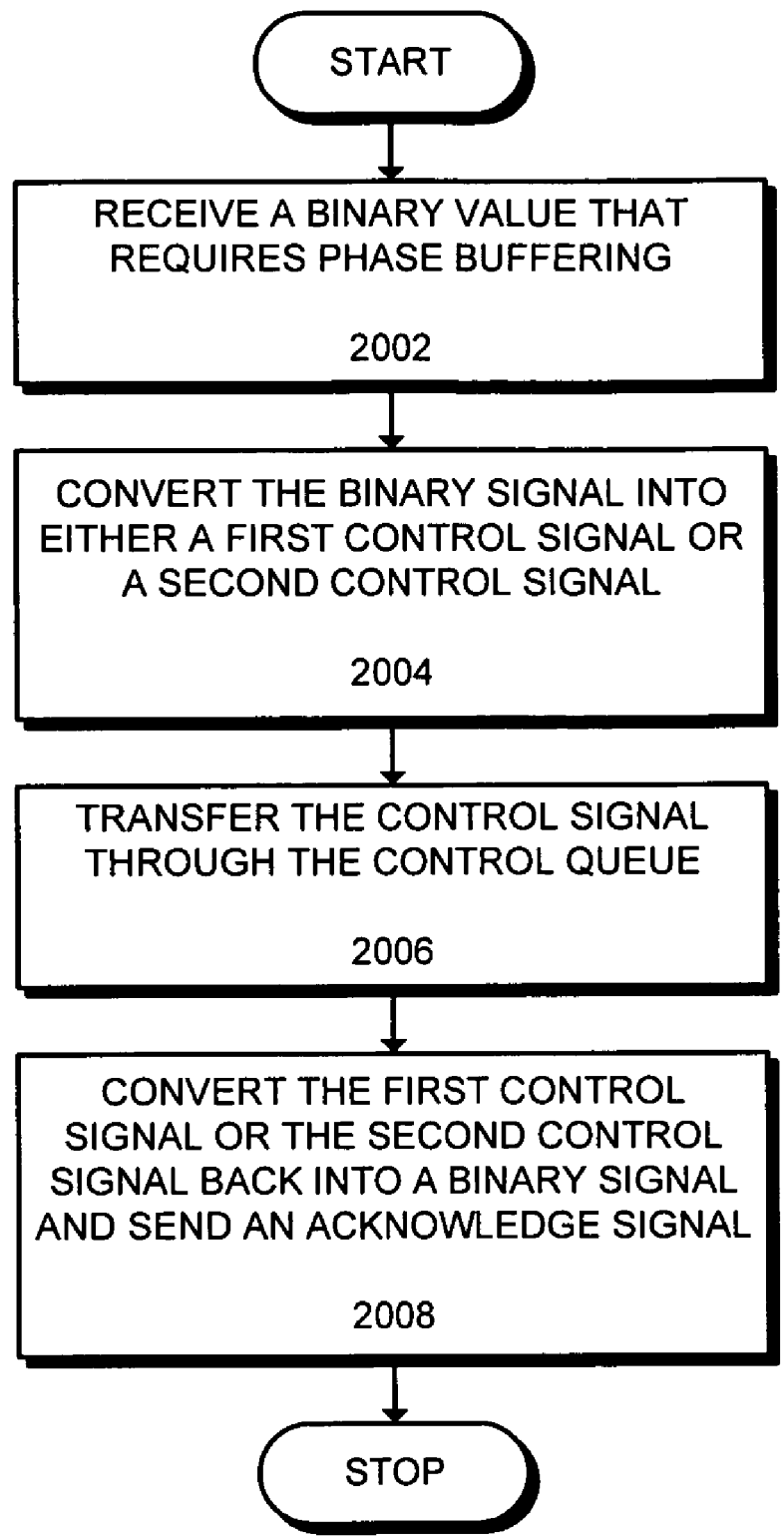
FIG. 20 presents a flowchart illustrating the process of using control queues to phase-buffer data in accordance with an embodiment of the present invention.

FIG. 20 presents a flowchart illustrating the process of using control queues to phase-buffer data in accordance with an embodiment of the present invention. The system starts when a binary value is received which requires phase buffering during communication between a source and a destination (step 2002). Next, the system converts the binary signal into either a first control signal or a second control signal, wherein the first control signal and the second control signal are mutually exclusive (step 2004), which means that only one of the control signals can be asserted at any time. Note that a binary value of zero can be encoded as the first control signal being asserted while a binary value of one can be encoded as the second control signal being asserted.

Next, the system transfers the control signal through stages of the control queue (step 2006). Finally, the receiving end converts the first control signal and the second control signal back into a binary value, and also sends an acknowledge signal back to the control queue, which will eventually ripple back through the stages of the control queue to the sending end (step 2008).

CONCLUSIONS

A control queue is ideal for implementing a one-bit data path phase buffer, because the circuit is small and more robust than a one-bit FIFO for the same speed of operation. Signaling from stage to stage in the queue is by control signals only. Thus, in a queue design there is no control-to-data bundling constraint. This eases the design task and results in a faster circuit. In contrast, in a FIFO design, careful delay matching and addition of delay margin are required between the control and data paths to satisfy the control-to-data bundling constraint. Several asP* implementations have been presented of a queue stage that has a range of circuit complexity and speed.

The balanced asP* control queue stage design shown in FIG. 16 may well be the most attractive circuit implementation for use as a phase buffer. It offers a simple circuit design using standard gates and has five-inversion loops for very robust operation.

Alternatively, if speed is of primary concern, the fast asP* control queue stage of FIG. 17A offers the same high speed performance as an asP* FIFO. Asynchronous queue modules are more robust than FIFO modules with a one-bit data path, because there is no control-to-data bundling constraint.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that performs phase-buffering on a bit-by-bit basis using control queues, comprising:
    a control queue configured to accept a first control signal and a second control signal, wherein the first control signal and the second control signal are mutually exclusive;
    wherein the first control signal being asserted indicates the value of a corresponding bit is zero, while the second control signal being asserted indicates the value of the corresponding bit is one;
    wherein the control queue includes a number of stages, wherein each control queue stage is comprised of asP* circuitry that provides four forward gate delays, six reverse gate delays, and three inversion loops;
    a forward-transfer mechanism within a stage configured to couple the first control signal and the second control signal from an input of the stage through storage elements to an output of the stage; and
    a reverse-transfer mechanism configured to accept an acknowledgement signal at the output of the stage and to transfer the acknowledgement signal through a storage element to the input of the stage.

2. The apparatus of claim 1, wherein stages for each bit of the control queue form a phase buffer that is coupled between a data transmitter and a data receiver, and wherein the data transmitter sends the bit to the phase buffer and the data receiver takes the bit from the phase buffer.

3. A method to facilitate phase-buffering on a bit-by-bit basis using control queues, comprising:
    receiving a binary signal that requires phase buffering at a control queue during a data transfer between a source and a destination, wherein the control queue is comprised of one or more asP* queue stages, each asP* queue stage including four forward gate delays, six reverse gate delays, and three inversion loops;
    converting the binary signal into a first control signal and a second control signal, wherein the first control signal represents a binary zero and the second control signal represents a binary one;
    transferring one of the first control signal and the second control signal from an input of the control queue to an output of the control queue;
    receiving an acknowledgement of a control signal at the output of the control queue; and
    forwarding the acknowledgement through the control queue in the reverse direction to the input of the control queue.

4. A computer system to facilitate phase-buffering on a bit-by-bit basis using control queues, comprising:
    a processing unit;
    a control queue coupled between the I/O mechanism and the processing unit that is configured to accept a first control signal or a second control signal, wherein the first control signal and the second control signal are mutually exclusive;
    wherein the control queue is comprised of one or more asP* queue stages, each asP* queue stage including four forward gate delays, six reverse gate delays, and three inversion loops;
    a forward-transfer mechanism configured to couple the first control signal and the second control signal from an input of the control queue to an output of the control queue;
    an acknowledgement mechanism configured to accept an acknowledgement signal at the output of the control queue; and
    a reverse transfer mechanism configured to couple the acknowledgement signal from the output of the control queue to the input of the control queue.

* * * * *